United States Patent
Dreps et al.

(10) Patent No.: US 9,459,982 B2
(45) Date of Patent: Oct. 4, 2016

(54) BUS INTERFACE OPTIMIZATION BY SELECTING BIT-LANES HAVING BEST PERFORMANCE MARGINS

(71) Applicant: INTERNATIONAL BUSINESS MACHINES CORPORATION, Armonk, NY (US)

(72) Inventors: Daniel Mark Dreps, Georgetown, TX (US); Frank D. Ferraiolo, Naples, FL (US); Anand Haridass, Bangalore (IN); Prasanna Jayaraman, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 14/299,319

(22) Filed: Jun. 9, 2014

(65) Prior Publication Data
US 2015/0193316 A1 Jul. 9, 2015

Related U.S. Application Data

(63) Continuation of application No. 14/147,732, filed on Jan. 6, 2014.

(51) Int. Cl.
*G06F 11/30* (2006.01)
*G06F 11/24* (2006.01)
(Continued)

(52) U.S. Cl.
CPC ....... *G06F 11/3041* (2013.01); *G06F 11/2002* (2013.01); *G06F 11/2007* (2013.01);
(Continued)

(58) Field of Classification Search
CPC .................................................. G06F 11/3041
See application file for complete search history.

(56) References Cited

U.S. PATENT DOCUMENTS

| 4,112,488 A * | 9/1978 | Smith, III | ............... G06F 11/18 709/222 |
| 5,045,720 A | 9/1991 | Bae | |

(Continued)

FOREIGN PATENT DOCUMENTS

| CN | 102394787 A * | 3/2012 | ............. H04L 12/24 |
| WO | WO 2014113957 A1 * | 7/2014 | ........... H04L 43/0811 |

OTHER PUBLICATIONS

Henderson, Daniel et al. POWER7 System RAS: Key Aspects of Power Systems Reliability, Availability, and Serviceability, Aug. 23, 2010, IBM, pp. 26-27.*

(Continued)

*Primary Examiner* — Albert Decady
*Assistant Examiner* — Paul Contino
(74) *Attorney, Agent, or Firm* — Mitch Harris, Atty at Law, LLC; Andrew M. Harris; Steven L. Bennett

(57) ABSTRACT

A bus interface selects bit-lanes to allocate as spares by testing the performance margins of individual bit-lanes during initialization or calibration of the bus interface. The performance margins of the individual bit-lanes are evaluated as the operating frequency of the interface is increased until a number of remaining bit-lanes that meet specified performance margins is equal to the required width of the interface. The bit-lanes that do not meet the required performance margins are allocated as spares and the interface can be operated at the highest evaluated operating frequency. When an operating bit-lane fails, one of the spare bit-lanes is allocated as a replacement bit-lane and the interface operating frequency is reduced to a frequency at which the new set of operating bit-lanes meets the performance margins. The operating frequency of the interface can be dynamically increased and decreased during operation and the performance margins evaluated to optimize performance.

20 Claims, 6 Drawing Sheets

(51) Int. Cl.
  *G06F 11/34* (2006.01)
  *G06F 11/22* (2006.01)
  *G06F 11/20* (2006.01)
(52) U.S. Cl.
  CPC ....... *G06F11/2033* (2013.01); *G06F 11/2038* (2013.01); *G06F 11/221* (2013.01); *G06F 11/24* (2013.01); *G06F 11/3027* (2013.01); *G06F 11/34* (2013.01); *G06F 11/349* (2013.01); *G06F 11/3409* (2013.01); *G06F 11/3466* (2013.01); *G06F 11/3485* (2013.01)

(56) References Cited

U.S. PATENT DOCUMENTS

| | | | | |
|---|---|---|---|---|
| 5,666,480 | A * | 9/1997 | Leung | G06F 11/1032 257/E21.526 |
| 6,999,411 | B1 * | 2/2006 | Brewer | H04L 45/28 370/220 |
| 7,073,088 | B2 * | 7/2006 | Jo | G06F 11/2007 710/305 |
| 7,080,288 | B2 | 7/2006 | Ferraiolo et al. | |
| 7,117,126 | B2 | 10/2006 | Floyd et al. | |
| 7,394,980 | B1 * | 7/2008 | Richards | H04B 10/0775 398/16 |
| 7,712,010 | B2 | 5/2010 | Dell | |
| 7,813,266 | B2 | 10/2010 | Becker et al. | |
| 7,895,374 | B2 | 2/2011 | Ferraiolo et al. | |
| 8,001,412 | B2 | 8/2011 | Ferraiolo et al. | |
| 8,050,174 | B2 | 11/2011 | Becker et al. | |
| 9,087,025 | B2 * | 7/2015 | Hollis | G06F 11/1008 |
| 2002/0099980 | A1 * | 7/2002 | Olarig | G06F 11/2007 714/43 |
| 2004/0120407 | A1 | 6/2004 | Searles et al. | |
| 2004/0136319 | A1 | 7/2004 | Becker et al. | |
| 2004/0246786 | A1 | 12/2004 | Vogt | |
| 2005/0108458 | A1 * | 5/2005 | Vogt | G06F 13/4256 711/1 |
| 2006/0212775 | A1 * | 9/2006 | Cypher | H03M 13/09 714/758 |
| 2007/0067548 | A1 * | 3/2007 | Juenger | G06F 13/40 710/315 |
| 2008/0082878 | A1 * | 4/2008 | Check | G01R 31/31855 714/724 |
| 2009/0060520 | A1 | 3/2009 | Cole et al. | |
| 2009/0193315 | A1 * | 7/2009 | Gower | G06F 11/1004 714/758 |
| 2010/0005202 | A1 * | 1/2010 | Ferraiolo | G06F 11/2007 710/51 |
| 2010/0174955 | A1 * | 7/2010 | Carnevale | G11C 5/04 714/718 |
| 2010/0199017 | A1 * | 8/2010 | Hollis | G06F 11/1008 710/316 |
| 2013/0159761 | A1 | 6/2013 | Baumgartner et al. | |
| 2013/0188656 | A1 | 7/2013 | Ferraiolo et al. | |
| 2014/0043042 | A1 * | 2/2014 | Billau | G06F 21/606 324/612 |
| 2014/0189433 | A1 | 7/2014 | Schoenborn et al. | |
| 2014/0376364 | A1 * | 12/2014 | Franzon | G06F 11/2007 370/228 |
| 2015/0058515 | A1 * | 2/2015 | Jacobson | G06F 13/4022 710/313 |
| 2015/0074466 | A1 * | 3/2015 | Adar | G06F 11/221 714/43 |
| 2015/0113333 | A1 * | 4/2015 | Kim | G06F 1/26 714/43 |
| 2015/0278040 | A1 * | 10/2015 | Sikkink | G06F 11/2002 714/5.1 |
| 2015/0317228 | A1 * | 11/2015 | Liu | G06F 1/3275 702/186 |
| 2015/0324265 | A1 * | 11/2015 | Nelson | G06F 11/221 714/43 |

OTHER PUBLICATIONS

Notice of Allowance in U.S. Appl. No. 14/147,732 mailed on Sep. 17, 2015, 16 pages (pp. 1-16 in pdf).
Woh, et al., "An Ultra Low Power SIMD Processor for Wireless Devices", 2010 Conference Record of the 44th Asilomar Conference on Signals, Systems and Computers (ASILOMAR), Nov. 2010, 5 pages (pp. 1-5 in pdf), Pacific Grove, CA, US.
Romanescu, et al., "Reducing the Impact of Intra-Core Process Variability with Criticality-Based Resource Allocation and Prefetching", ACM International Conference on Computing Frontiers, May 2008, pp. 1-10, Ischia, Italy.
U.S. Appl. No. 14/147,732, filed Jan. 6, 2014, Dreps, et al.

* cited by examiner

BUS INTERFACE OPTIMIZATION BY SELECTING BIT-LANES HAVING BEST PERFORMANCE MARGINS

The present application is a Continuation of U.S. patent application Ser. No. 14/147,732, filed on Jan. 6, 2014 and claims priority thereto under 35 U.S.C. 120. The disclosure of the above-referenced parent U.S. patent application is incorporated herein by reference.

BACKGROUND OF THE INVENTION

1. Field of the Invention

The present invention relates generally to electronic interface operation, and more particularly, to interfaces that are reconfigurable during or after a calibration phase that measures performance of bit-lanes.

2. Description of Related Art

Interfaces within and between present-day integrated circuits have increased in operating frequency and width. In particular, in multiprocessing systems, both wide and fast connections are provided between many processing units. Data width directly affects the speed of data transmission between systems components, as does the data rate, which is limited by the maximum frequency that can be supported by an interface. Calibration routines performed during system initialization, when an interconnect problem is detected, or periodically for maintenance purposes, automatically test the interconnect and may adjust parameters of the interface circuits in order to align bit-lanes and improve overall performance.

Present-day systems interconnect designs may provide fault-tolerance by including spare bit-lanes that are either unused unless needed, i.e., when a failed bit-lane is detected. However, the spare bit-lanes add cost and require physical space to implement. In some systems, spare bit-lanes are used to provide alternate communications paths for information such as checkbits or parity bits.

It is therefore desirable to provide a method that leverages the presence of spare bit-lanes to improve performance and/or reliability of a system that includes a bus interface.

BRIEF SUMMARY OF THE INVENTION

The above-mentioned objective of providing improved performance and/or reliability of a bus interface is provided in an interface method.

The method measures performance of the interface while operating the interface at a frequency for which performance margins specified for the interface are violated for a number of the bit-lanes. The bit-lanes that do not meet the performance margins are allocated as spare bit-lanes and the remainder of the bit-lanes of the interface are set as the operational bit-lanes, and the interface is operated using the operational bit-lanes. When an operating bit-lane fails, one of the spare bit-lanes is allocated as a replacement and the operating frequency of the interface is reduced to meet the performance margins. The measuring can be performed repeatedly while increasing the operating frequency of the interface until only the required number of bit-lanes still meet the performance margins and that frequency can be used as the operating frequency of the interface during subsequent operation. Alternatively, or in combination, the operating frequency of the interface can be dynamically increased and decreased while measuring performance margins, so that the interface operating frequency can be maximized while meeting the performance margins for all of the operating bit-lanes.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses bus interface management techniques that determine the performance margins of the bit-lanes making up the bus interface and allocate the bit-lanes having worst performance as spares. The techniques can then adjust the interface frequency upward in order to take advantage of any additional performance available from the bus interface due to variations between the bit-lanes, either in the design, due to fabrication variation, or due to environmental conditions. The techniques are embodied in a method that is generally implemented by a processor executing program instructions, such as a service processor, and by a computer program product embodying the program instructions. The operating frequency may also be additionally selected according to utilization and/or power savings schemes, so that an increased operating frequency is attempted only upon demand and/or a lowered operating frequency may be commanded when power savings are required.

Figure 1:
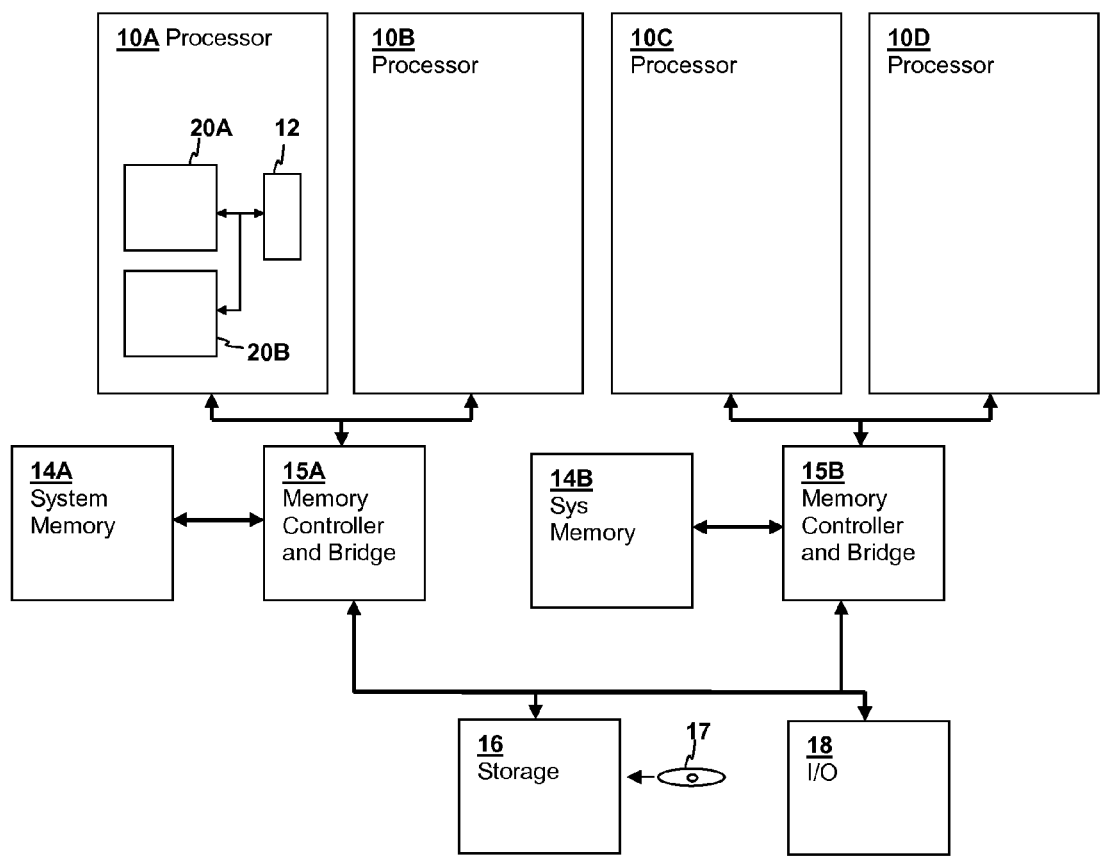
FIG. 1 is a block diagram of a computer system in which techniques in accordance with embodiments of the invention are implemented.

Referring now to FIG. 1, a processing system in which techniques in accordance with an embodiment of the present invention are practiced is shown. The depicted processing system includes a number of processors 10A-10D, each coupled to a memory controller/bridge 15A, 15B in conformity with an embodiment of the present invention. The depicted multi-processing system is illustrative, and processing system in accordance with other embodiments of the present invention include uni-processor systems that are interconnected by interface buses. Processors 10A-10D are identical in structure and include cores 20A-20B and a cache/local storage 12, which may be a cache level, or a level of internal system memory. Processors 10A-10B are coupled to a main system memory 14A by memory controller/bridge 15A, a storage subsystem 16, which includes non-removable drives and optical drives, for reading media such as a CD-ROM 17 forming a computer program product and containing program instructions implementing operating systems and other software for execution by processors 10A-10D. The illustrated processing system also includes input/output (I/O) interfaces and devices 18 such as mice and keyboards for receiving user input and graphical displays for displaying information. Processors 10C-10D are similarly coupled to a main system memory 14B, storage subsystem 16, which includes non-removable drives and optical drives, for reading media such as CD-ROM 17, by memory controller/bridge 15B. While the system of FIG. 1 is used to provide an illustration of a system in which the interface architecture of the present invention is implemented, it is understood that the depicted architecture is not limiting and is intended to provide an example of a suitable computer system in which the techniques of the present invention are applied.

Figure 2:
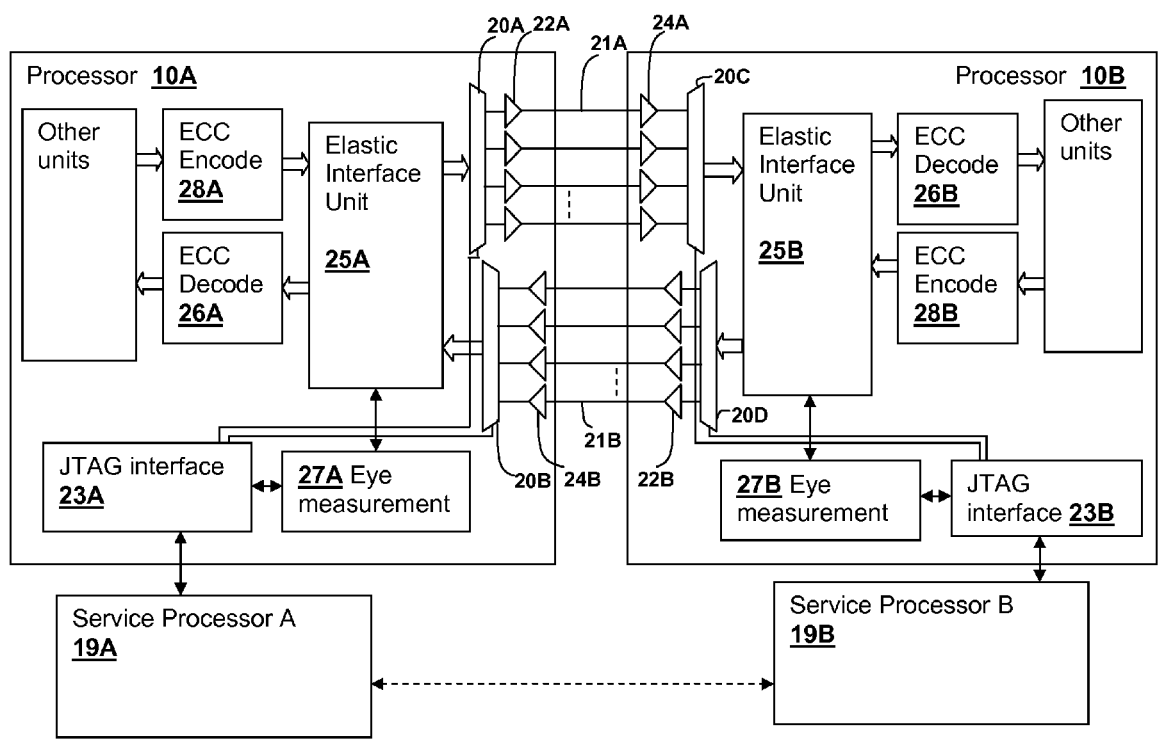
FIG. 2 is a block diagram of an interface connecting two processing blocks in the computer system of FIG. 1.

With reference now to the figures, and in particular with reference to FIG. 2, a bus interface is depicted between two processors 10A and 10B. While processors 10A and 10B are used to illustrate and support the data connection of two units, the techniques of the present invention extend to address, control and other signal types, as well as connection of memories, peripherals and other functional units within a computer system or other electronic device. The interface between processors 10A and 10B is made by a physical connection of output signals 21A from processor 10A to inputs of processor 10B and output signals 21B from processor 10B to inputs of processor 10A, however the techniques of the present invention extend to non-physically connected (wireless) interfaces having multiple datapaths and to bi-directional interfaces, as well.

Within processors 10A and 10B, input signals are received by elastic interface (EI) units 25A and 25B, features of which may include features as described in detail in U.S. Pat. No. 8,050,174 entitled "SELF HEALING CHIP-TO-CHIP INTERFACE", U.S. Pat. No. 7,117,126 entitled "DATA PROCESSING SYSTEM AND METHOD WITH DYNAMIC IDLE FOR TUNABLE INTERFACE CALIBRATION" and in U.S. Pat. No. 7,080,288 entitled "METHOD AND APPARATUS FOR INTERFACE FAILURE SURVIVABILITY USING ERROR CORRECTION." The disclosures of the above-referenced U.S. patents are incorporated herein by reference. Signals on output signals 21A and 21B are received by elastic interface (EI) units 25A and 25B, which include receivers 24A and 24B that provide signals to selectors 20C and 20B. In the interface depicted in FIG. 2, some of the bit-lanes provided by output signals 21A and 21B are not used for operational communications, but rather are provided as spares. The present invention is directed toward selection of the particular bit-lanes to allocate as spares and which bit-lanes to use as operating bit-lanes, as will be described in further detail below. Another pair of selectors 20A and 20D route data from the outputs of EI units 25A and 25B respectively, to driver circuits 22A and 22B, respectively according to which of the bit-lanes are selected as operating bit-lanes. Selectors 20A-20D may be implemented as described in the above-incorporated U.S. patent "SELF HEALING CHIP-TO-CHIP INTERFACE."

At the opposing ends of the bus interface, receivers 24A and 24B receive the output signals provided from driver circuits 22A and 22B, respectively. The spare bit-lanes may or may not be active, but the data transmitted between processor 10A and processor 10B is carried by the operating bit-lanes, which are in a subset of output signals 21A and 21B. The signals from the operating bit-lanes are routed to the appropriate inputs of elastic interface units 25A, 25B by selector circuits 20B and 20C, respectively. EI units 25A, 25B contain control logic and buffers that permit operation of the bus interface over a wide frequency range, e.g., a range of 1.25:1. The outputs of EI units 25A and 5B are then provided to error checking and correction (ECC) decode units 26A and 26B that are capable of detecting 2-bit errors and correcting single bit errors. The present invention uses ECC decode units 26A and 26B to not only correct dynamic bit errors as ECC units are typically employed to correct, but to maintain interface operation when a bit-lane has completely failed or when the frequency of the interface has been adjusted such that errors occur before the frequency is decreased to maintain safe operating margins as described below. Output drivers 22A and 22B are preferably provided on-chip (but could be located off-chip) and receive ECC encoded data from ECC encode units 28A and 28B that provide the proper correctable bit patterns for transmission between processors 10A and 10B over interface connections 21A and 21B. The interface depicted in FIG. 2 will generally also include the static wire test logic described in the above-incorporated U.S. patent "METHOD AND APPARATUS FOR INTERFACE FAILURE SURVIVABILITY USING ERROR CORRECTION", the details of which are omitted herein for clarity. The result of the DC wire tests further inform the selection of spare bit-lanes, so that a completely failed bit-lane, e.g., due to an open connection or shorted wire, will be selected as a spare bit-lane and remain unused.

Eye measurement circuits 14A and 14B evaluate the edge positions of the received data so that the program that controls the frequency of the interface and the allocation of spare bit-lanes is enabled to determine whether performance margins are met for current operating conditions. Eye measurement circuits 27A and 27B are also used to evaluate each of the bit-lanes during initialization and calibration of the interface for selecting which of the spare bit-lanes will be allocated as spares and which will be allocated as operating bit-lanes. JTAG Interfaces 23A and 23B provide a mechanism for controlling and checking the results of the tests performed by eye measurement circuits, as well as other control, maintenance and test functions within processors 10A and 10B, such as the selection of the operating bit-lanes by programming selectors 20A-20D. JTAG Interfaces 23A and 23B are each coupled to one of service processors 19A and 19B (which may be alternatively the same shared service processor) for controlling test operations such performance margin evaluations described below, according to program instructions that carry out one or more of the methods as described herein. Alternatively control logic in the form of a state machine may provide the selection and measurement control functions. Service processors 19A and 19B include memories for storing the program instructions and data, such as tables of the bit-line performance margins vs. operating frequency that are obtained from laboratory or real-time measurements as described in further detail below. EI units 25A and 25B include delay lines and control logic to support an interface that is aligned at initialization via an Interface Alignment Procedure (IAP) that tunes the input delay of EI units 25A and 25B to achieve the best attainable position (delay) of the input signals with respect to the clock used to latch or sample the input values. The interface may also be periodically recalibrated so that optimal operation of EI units 25A and 25B is maintained. The delay lines used to implement EI units 25A and 25B are sensitive to both supply voltage and temperature, so periodic recalibration provides for operation of the interface at higher frequencies and/or lower error rates than could otherwise be attained without recalibration.

Figure 3:
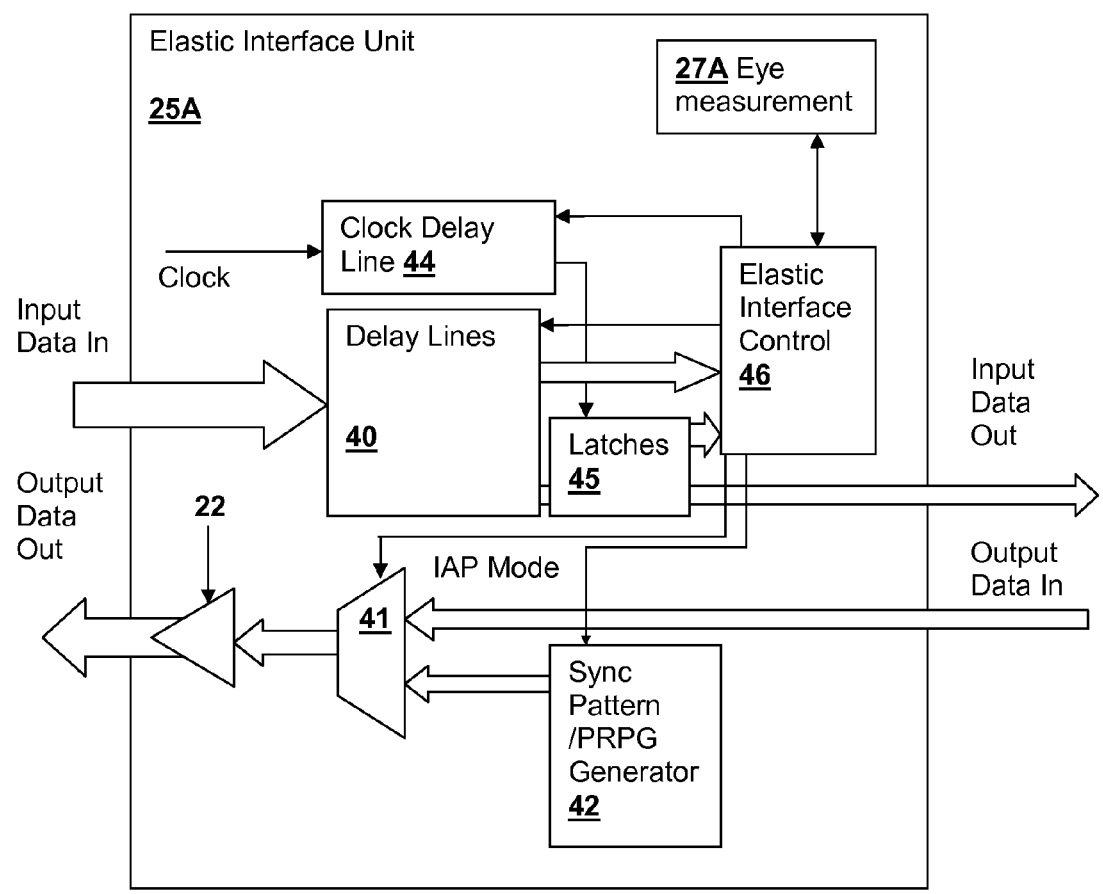
FIG. 3 is a block diagram of an interface unit within the interface of FIG. 2.

Referring now to FIG. 3, details of elastic interface unit 25A (and similarly elastic interface unit 25B) are depicted. A set of individual bit delay lines 40 provides for de-skew of data arriving at the inputs of elastic interface unit 25A (and similarly 25B elastic interface unit), by adding delays to all bits other than the latest arriving bit signal(s). De-skew is performed only at initialization alignment (IAP) under the control of an elastic interface control logic 46. After de-skew at initialization and also during periodic recalibration, elastic interface control 46 selects a clock delay for a clock delay line 44 that centers a latch enable provided to bit latches 45 in the center of the eye diagram for the data. Iterative techniques are used by elastic interface control 46, which contains edge detectors and guard-band logic for determining optimal clock position with respect to the de-skewed data output of delay lines 40. Elastic interface control 46 tests both edges of the data window for all bits, detecting the first edges of the earliest bit and the last edges of the latest bit and then centers the clock position in the middle of the composite data window by adjusting clock delay line 44.

A multiplexer 41 coupled to the provided output data is used to select between system or "mission" output data and sync/AC wiretest/recalibration patterns generated by a sync/PRPG generator 42 for performing IAP/AC wiretest/recalibration in the remotely connected elastic interface unit 25B (and similarly, the patterns for performing the above-described tests on elastic interface unit 25A receiver circuits are provided by identical or similar output pattern generation circuits within elastic interface unit 25B). The output signals from multiplexer 41 are provided to drivers 22 for output on the interface wires. After IAP has been performed using the sync pattern mode of sync/PRPG generator 42, the AC tests provided by a pattern generation mode of sync/PRPG generator 42 are performed. During periodic recalibration, another PRPG pattern is used that provides a more precise alignment than the sync pattern mode of sync/PRPG generator 42 that generates random patterns simulating actual data transfer. A recalibration is generally forced before actively using the elastic interface, in order to perform more optimal alignment of clock delay line 44.

Figure 4:
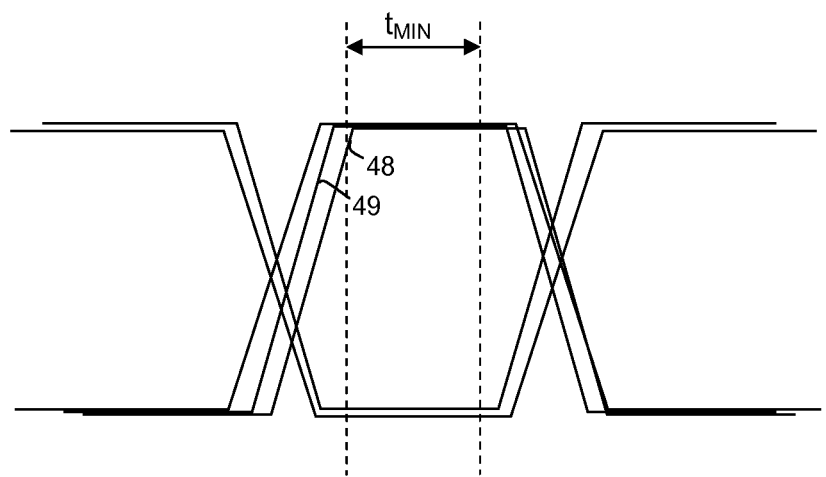
FIG. 4 is a waveform diagram illustrating an eye diagram measurement within the interface of FIG. 2.

The above-described calibration measures the opening of the eye diagrams for the bitlines (the time $t_{EYE}$ between the latest falling edge and the earliest rising edge) to determine if $t_{EYE}$ meets a minimum specified duration $t_{MIN}$. The methods disclosed below also produce a table or list of the bit-lanes in order of increasing $t_{EYE}$ and allocate the bit-lanes having the lowest $t_{EYE}$ as spares. Other criteria may be applied in addition to, or in some implementations as an alternative to, the eye diagram opening duration $t_{EYE}$, for example, the total jitter for each bit-line might be measured, signal voltage levels might add a further criteria, etc. Referring now to FIG. 4, a waveform diagram with exemplary eye diagrams for a set of bit-lanes is shown in an overlaid configuration, with a bit-lane waveform 49 for a first bit-lane that meets the minimum specified eye window duration $t_{MIN}$ and another bit-lane waveform 48 that does not meet the minimum specified eye window duration $t_{MIN}$ at the current operating frequency. As detailed below, the methods of the present invention trade off bus interface operating frequency for performance margin, so that operating frequency is optimized while ensuring that all bit-lanes not allocated as spares meet the performance margins. The operating frequency that is ultimately chosen is not necessarily an operating frequency for which spare bit-lanes will fail the performance margin test(s), but the bit-lanes allocated as spares are those bit-lanes for which the performance margins are least exceeded. In the methods described below, the circuits that provide performance enhancements may be disabled to determine the operating frequency, e.g., delay lines 40 in FIG. 3 and ECC circuits 26A-26B and 28A-28B in FIG. 2. The enhancements disabled condition can be removed and performance margin criteria again applied, or the enhancements may be applied only after the spare lanes have been allocated and the bus interface operating frequency determined, so that the enhancements only provide additional performance margin.

Figure 5:
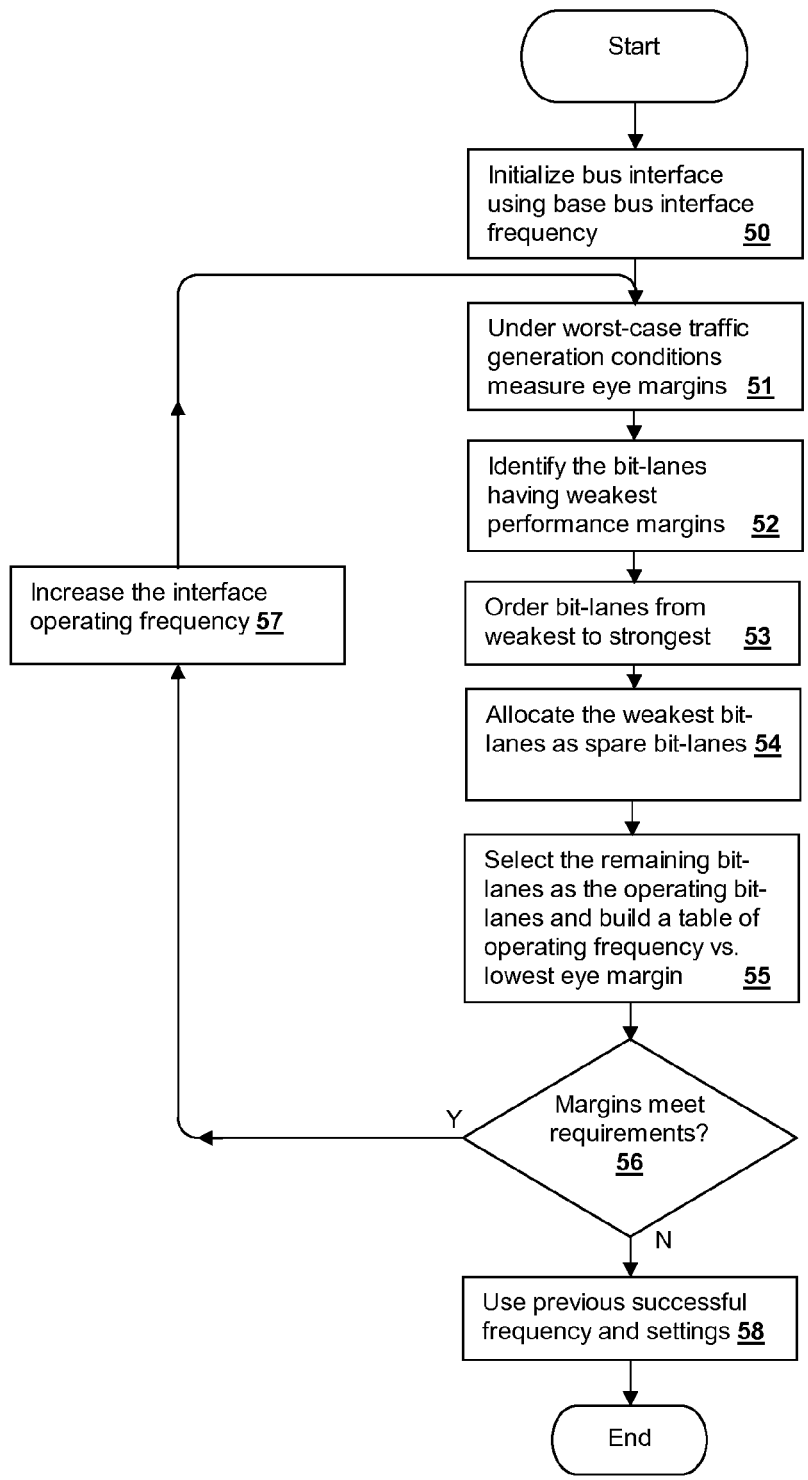
FIG. 5 is a flowchart showing a method in accordance with an embodiment of the present invention.

Referring now to FIG. 5, a first method of operating a bus interface is illustrated in a flowchart. First, the interface is initialized using a base bus interface operating frequency that is determined for the design, or alternatively for the particular unit (step 50). During initialization and calibration, and optionally during subsequent calibration intervals that are performed periodically or in response to detecting an error, worst-case traffic is generated and the eye margins for the bit-lanes are measured (step 51). The bit-lanes having the weakest (smallest) performance margins are identified (step 52) and a list or table of the bit-lanes is generated ordered according to performance margin from weakest to strongest (step 53). The weakest bit-lanes are allocated as spare bit-lanes (step 54). The remaining bit-lanes are selected as the operating bit-lanes and a table of lowest eye margin vs. operating frequency is built for the operating bit-lanes (step 55). While the performance margins for the operating bit-lanes meet the performance requirements (decision 56) the interface operating frequency is increased (step 57) and the table is populated by repeating steps 51-56. Once an operating frequency is reached for which the performance margins are not met (decision 56), a previously successful setting is applied (step 58) and the bus-interface is operated at the selected operating frequency until a next calibration cycle.

Figure 6:
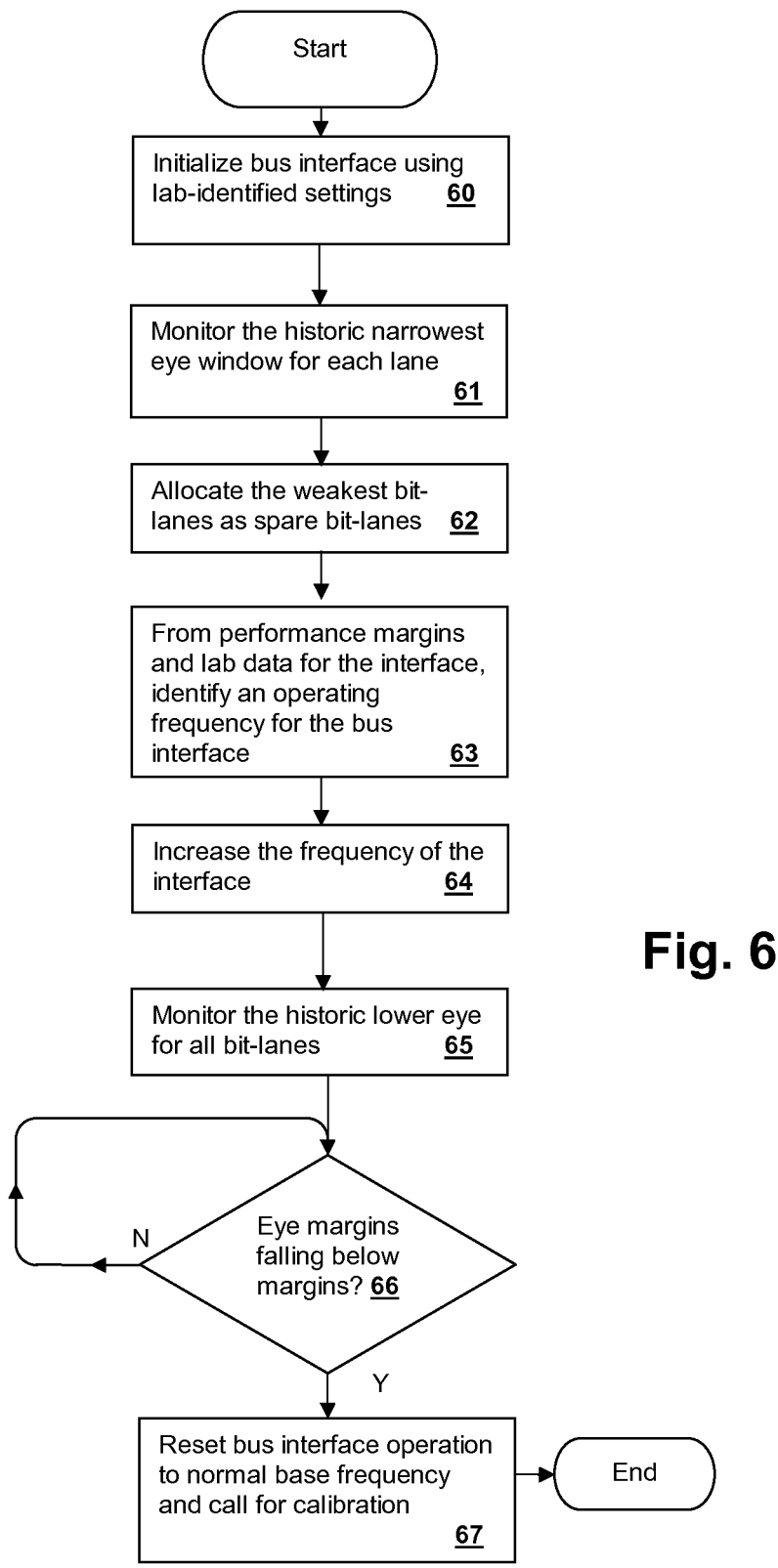
FIG. 6 is a flowchart showing a method in accordance with another embodiment of the present invention.

Referring now to FIG. 6, a second method of operating a bus interface is illustrated in a flowchart. First, the interface is initialized using lab-identified settings for the design or for the particular unit (step 60). The bit-lanes are monitored for the narrowest historic eye window (or other performance margin) (step 61). The bit-lanes having the weakest (smallest) performance margins are identified (step 62). From laboratory data and the measured historic performance margins, e.g., by interpolation or from tables, an operating frequency is identified and applied (step 63). The operating frequency of the interface is then increased (step 64) and the interface continues to monitor the historic lowest eye margin for the bit-lanes (step 65). While the eye margins are greater than or equal to the specified margins (decision 66) the interface is operated at the selected frequency. When the eye margins fall below the specified margins (decision 66) the interface frequency is reset to the normal base frequency and calibration is initiated.

As noted above, portions of the present invention may be embodied in a computer program product, e.g., a program executed by service processors 19A-19B having program instructions that direct the operations outlined in FIG. 5 or FIG. 6, by controlling the interfaces of FIG. 2 and FIG. 3. The computer program product may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of operating a bus interface, the method comprising:
   measuring performance of the bus interface at a first operating frequency of the bus interface;
   allocating bit-lanes for which performance margins lie closest to specified minimum performance margins at the first operating frequency as spare bit-lanes and the remainder of the bit-lanes of the bus interface as operational bit-lanes, wherein at a center of a data window the operational bit-lanes individually represent bits of a value communicated in parallel over the bus interface at the first operating frequency;
   subsequent to the measuring the performance, operating the bus interface using the operational bit-lanes; and
   responsive to detecting a failure of one of the operational bit-lanes, allocating a replacement bit-lane from the spare bit-lanes.

2. The method of claim 1, wherein the first operating frequency of the bus interface is an operating frequency for which performance margins specified for the bus interface are violated for a number of the bit-lanes, wherein the allocating allocates the bit-lanes for which performance margins are violated at the first operating frequency as spare bit-lanes and the remainder of the bit-lanes of the bus interface as operational bit-lanes, and wherein the method further comprises responsive to allocating the replacement bit-lane, operating the bus interface at an operating frequency less than the first operating frequency for which the replacement bit-lane does not violate the performance margins specified for the bus interface.

3. The method of claim 2, wherein the subsequently operating operates the bus interface at the first operating frequency.

4. The method of claim 2, further comprising repeating the measuring while increasing the operating frequency of the bus interface until the performance margins are violated for the number of the bit-lanes when the operating frequency has been increased to the first operating frequency.

5. The method of claim 2, wherein the measuring comprises:
   first measuring the performance of the bus interface with correction circuitry disabled at a nominal operating frequency to determine worst-case performance margins for the bit-lanes, wherein the allocating allocates any bit-lanes that fails the worst-case performance margins as spare bit-lanes;
   second measuring the performance of the bus interface with the correction circuitry enabled to determine corrected performance margins for the bit-lanes, wherein the allocating allocates any bit-lanes for which the corrected performance margins violate the specified performance margins as spare bit-lanes; and
   repeating the second measuring while increasing the operating frequency of the bus interface until the number of bit-lanes not allocated as spares is equal to the number of bit-lanes required for operation of the bus interface.

6. The method of claim 2, further comprising:
   evaluating the performance for standardized workloads of an interface design having the same characteristic as the bus interface;
   storing an initial operating frequency and set of operating bit-lanes for the bus interface, wherein the allocating initially allocates the set of operating bit-lanes as the operational bit-lanes;
   initializing the bus interface at the initial operating frequency, wherein the measuring is performed subsequent to the initializing during operation;
   increasing the operating frequency of the bus interface during operation; and
   responsive to the measuring determining the performance margins are violated for an operational bit-lane, reducing the operating frequency of the bus interface.

7. The method of claim 6, wherein the reducing the operating frequency of the bus interface restores the operating frequency of the bus interface to the initial operating frequency, and wherein the method further comprises performing a calibration of the bus interface in response to restoring the operating frequency of the bus interface to the initial operating frequency.

8. A computer system comprising a processor for executing program instructions coupled to a memory for storing the program instructions, wherein the program instructions are program instructions for configuring a bus interface, and wherein the program instructions comprise:
   program instructions initiating measurement of performance of the bus interface at a first operating frequency of the bus interface;
   program instructions for allocating the bit-lanes for which performance margins lie closest to specified minimum performance margins at the first operating frequency as spare-bit lanes and the remainder of the bit-lanes of the bus interface as operational bit-lanes, wherein at a center of a data window the operational bit-lanes individually represent bits of a value communicated in parallel over the bus interface at the first operating frequency;

program instructions that subsequent to the measuring the performance, configure the bus interface for operation using the operational bit-lanes; and program instructions that, responsive to detection of a failure of one of the operational bit-lanes, allocate a replacement bit-lane from the spare bit-lanes.

9. The computer system of claim 8, wherein the first operating frequency of the bus interface is an operating frequency for which performance margins specified for the bus interface are violated for a number of the bit-lanes, wherein the program instructions for allocating allocate the bit-lanes for which performance margins are violated at the first operating frequency as spare-bit lanes and the remainder of the bit-lanes of the bus interface as operational bit-lanes, and wherein the program instructions further comprise program instructions that, responsive to allocating the replacement bit-lane, configure the bus interface for operation at an operating frequency less than the first operating frequency for which the replacement bit-lane does not violate the performance margins specified for the bus interface.

10. The computer system of claim 9, wherein the program instructions that configure the bus interface configure the bus interface for operation at the first operating frequency.

11. The computer system of claim 9, further comprising program instructions for repeatedly initiating the measurement of the performance of the bus interface while increasing the operating frequency of the bus interface until the performance margins are violated for the number of the bit-lanes when the operating frequency has been increased to the first operating frequency.

12. The computer system of claim 9, wherein the program instructions for initiating the measurement comprise:

program instructions for first initiating measurement of the performance of the bus interface with correction circuitry disabled at a nominal operating frequency to determine worst-case performance margins for the bit-lanes, wherein the program instructions for allocating allocate any bit-lanes that fails the worst-case performance margins as spare bit-lanes;

program instructions for second initiating measurement of the performance of the bus interface with the correction circuitry enabled to determine corrected performance margins for the bit-lanes, wherein the program instructions for allocating allocate any bit-lanes for which the corrected performance margins violate the specified performance margins as spare-bit lanes; and program instructions for repeating the second initiating the measurement while increasing the operating frequency of the bus interface until the number of bit-lanes not allocated as spares is equal to the number of bit-lanes required for operation of the bus interface.

13. The computer system of claim 9, wherein the program instructions further comprise:

program instructions for evaluating the performance for standardized workloads of an interface design having the same characteristic as the bus interface;

program instructions for storing an initial operating frequency and set of operating bit-lanes for the bus interface, wherein the program instructions for allocating initially allocate the set of operating bit-lanes as the operational bit-lanes;

program instructions for initializing the bus interface at the initial operating frequency, wherein the program instructions for initiating measurement are executed subsequent to the initializing during operation;

program instructions for increasing the operating frequency of the bus interface during operation; and program instructions that, responsive to the program instructions for initiating measurement having determined that the performance margins are violated for an operational bit-lane, reduce the operating frequency of the bus interface.

14. The computer system of claim 13, wherein the program instructions that reduce the operating frequency of the bus interface restore the operating frequency of the bus interface to the initial operating frequency, and wherein the program instructions further comprise program instructions for initiating a calibration of the bus interface in response to restoring the operating frequency of the bus interface to the initial operating frequency.

15. A computer program product comprising a computer-readable storage device that is not a signal or propagating wave, the computer-readable storage device storing program instructions for operating a bus interface, wherein the program instructions are program instructions for:

initiating measurement of performance of the bus interface at a first operating frequency of the bus interface;

allocating the bit-lanes for which performance margins lie closest to specified minimum performance margins at the first operating frequency as spare-bit lanes and the remainder of the bit-lanes of the bus interface as operational bit-lanes, wherein at a center of a data window the operational bit-lanes individually represent bits of a value communicated in parallel over the bus interface at the first operating frequency;

subsequent to the measuring the performance, configuring the bus interface for operation using the operational bit-lanes; and responsive to detection of a failure of one of the operational bit-lanes, allocating a replacement bit-lane from the spare bit-lanes.

16. The computer program product of claim 15, wherein the first operating frequency of the bus interface is an operating frequency for which performance margins specified for the bus interface are violated for a number of the bit-lanes, wherein the program instructions for allocating allocate the bit-lanes for which performance margins are violated at the first operating frequency as spare-bit lanes and the remainder of the bit-lanes of the bus interface as operational bit-lanes, and wherein the program instructions further comprise program instructions for, responsive to allocating the replacement bit-lane, configuring the bus interface for operation at an operating frequency less than the first operating frequency for which the replacement bit-lane does not violate the performance margins specified for the bus interface.

17. The computer program product of claim 16, wherein the program instructions that configure the bus interface configure the bus interface for operation at the first operating frequency.

18. The computer program product of claim 16 further comprising program instructions for repeatedly initiating the measurement of the performance of the bus interface while increasing the operating frequency of the bus interface until the performance margins are violated for the number of the bit-lanes when the operating frequency has been increased to the first operating frequency.

19. The computer program product of claim 16, wherein the program instructions for initiating the measurement comprise program instructions for:
- evaluating the performance of the bus interface for standardized workloads of an interface design having the same characteristic as the bus interface;
- storing an initial operating frequency and set of operating bit-lanes for the bus interface, wherein the program instructions for allocating initially allocate the set of operating bit-lanes as the operational bit-lanes;
- initializing the bus interface at the initial operating frequency, wherein the measuring is performed subsequent to the initializing during operation;
- increasing the operating frequency of the bus interface during operation; and
- responsive to the program instructions for initiating measurement having determined that the performance margins are violated for an operational bit-lane, reducing the operating frequency of the bus interface.

20. The computer program product of claim 16, wherein the program instructions further comprise program instructions for:
- evaluating the performance for standardized workloads of an interface design having the same characteristic as the bus interface;
- storing an initial operating frequency and set of operating bit-lanes for the bus interface, wherein the allocating initially allocates the set of operating bit-lanes as the operational bit-lanes;
- initializing the bus interface at the initial operating frequency, wherein the program instructions for initiating measurement are executed subsequent to the initializing during operation;
- increasing the operating frequency of the bus interface during operation; and
- responsive to the measuring determining the performance margins are violated for an operational bit-lane, reducing the operating frequency of the bus interface.

* * * * *